United States Patent
Bragole et al.

[11] Patent Number: 5,939,342
[45] Date of Patent: Aug. 17, 1999

[54] LAMINATED PRODUCTS FOR AUTOMOTIVE INTERIOR TRIM APPLICATIONS

[75] Inventors: Robert A. Bragole, Danvers; Peter Kashian, Wayland, both of Mass.

[73] Assignee: Worhten Industries, Inc., Nashua, N.H.

[21] Appl. No.: 09/114,638

[22] Filed: Jul. 13, 1998

[51] Int. Cl.⁶ .................... B32B 7/00; B32B 7/12

[52] U.S. Cl. ............. 442/381; 442/382; 442/383; 442/263; 428/137

[58] Field of Search ............... 428/411.1, 423.7, 428/500, 137; 442/263, 382, 383, 381

[56] References Cited

U.S. PATENT DOCUMENTS

| | | |
|---|---|---|
| 4,350,727 | 9/1982 | Wald et al. . |
| 4,830,900 | 5/1989 | Sumii et al. . |
| 5,187,005 | 2/1993 | Stahle et al. . |
| 5,565,259 | 10/1996 | Juriga . |
| 5,656,357 | 8/1997 | Ogata et al. . |
| 5,707,735 | 1/1998 | Midkiff et al. . |

*Primary Examiner*—Deborah Jones
*Assistant Examiner*—Jason Savage
*Attorney, Agent, or Firm*—Samuels, Gauthier & Stevens

[57] ABSTRACT

A laminated product which comprises a base material such as a moldable felt base material, bonded to a facing material, such as an expanded vinyl. A heat activatable adhesive is used and the materials are bonded under pressure.

4 Claims, 1 Drawing Sheet

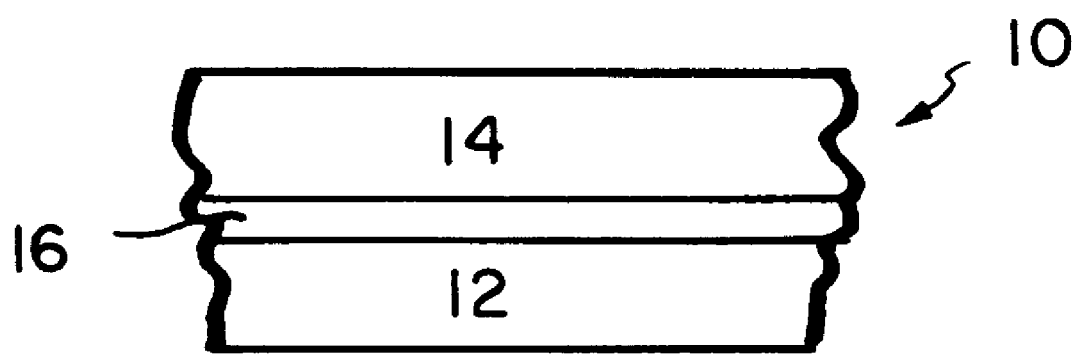

LAMINATED PRODUCTS FOR AUTOMOTIVE INTERIOR TRIM APPLICATIONS

BACKGROUND OF THE INVENTION

1. Field of the Invention

Adhesive systems for lamination of facing fabrics to base materials.

2. Background and Summary of the Invention

There are enumerable applications where an aesthetically pleasing and/or relatively expensive material is laminated (adhered) to a low cost substrate. In the automotive industry, the trim application in automobiles is illustrative of such laminated products. Typically, foamed materials, such as polyurethane or polypropylene are used as a base material. A facing fabric, such as nylon, is adhered to the base material to form a product. The product can be used for side panels, on doors, the back lumbar region of seats, package trays and the like.

The method of choice for adhesive bonding of the facing fabric to the base material uses flame lamination. However, flame lamination typically emits toxic byproducts. This requires the use of cost recovery systems which adds considerably to the cost of the product. Such laminates have also shown a susceptibility to break down in the presence of water during humidity and water immersion tests.

Laminating a facing material that has the necessary feel, appearance and wear characteristics to a base material in a cost effective manner is very desirable.

SUMMARY OF THE INVENTION

The present invention is directed to laminates which substitute fabrics for the base foamed material of the prior art and substitute lower cost facing fabrics, with aesthetically pleasing characteristics, for the higher cost facing fabrics currently used.

The invention also embodies a method of joining the base material to the facing fabrics which method replaces prior art flame lamination techniques.

Preferably, the base material is a spun bond fabric, either natural or synthetic, sometimes referred to as a moldable felt. This type of base material feels like a polyolefin foam but is much less expensive.

The facing fabrics can be polypropylene or polyester of a low pile, random pattern dilore construction.

Broadly, the invention comprises bonding a moldable felt to a facing fabric with heat activatable adhesives which include polyurethane or ethylene vinyl acetate based adhesives optionally compounded with acrylics, polyvinyl acetates, plasticizers, polyesters, etc. The heat activatable adhesives are preferably activated with radiant heat. This concentrates the heat on the adhesives without generating excessive heat on the facing fabric surface which can change the color of the fabric. Alternatively, hot melt adhesives are used.

The laminates disclosed herein meet or exceed the automotive industries standards for fogging, humidity, cycling and flexing.

BRIEF DESCRIPTION OF THE DRAWINGS(S)

The FIGURE is an illustration of a laminated product embodying the invention.

DESCRIPTION OF THE PREFERRED EMBODIMENT(S)

There are multiple combinations of base materials and facing fabrics within the scope of the invention. The base materials include moldable felt base materials, typically a needle punched polyester face tacked to a needle punched blend of 60/40 polypropylene/polyester. The facing materials are typically expanded vinyls, knit backed vinyls or knit backed semi-perforated vinyls, or a 10 denier polypropylene or polyester with a low pile, random pattern dilore construction in which the fibers are bonded together with latex or fused together with a polyolefin film.

Polyurethane based adhesives compounded with ethylene vinyl acetate are particularly useful for bonding the base materials and facing materials described above. The use of an isocyanate curative with these adhesives enhances the adhesive ability to pass humidity tests. The curative also promotes adhesion and can help render the system antifogging.

The preferred embodiment will be described with reference to heat activatable adhesives coated on each surface of a base material and a facing fabric with the adhesives being activated by heat lamps applied directly to the adhesive surface and then subsequent bonding to form a laminate.

The laminated products of Examples I–V all passed Ford Motor Company's published specification ESB-M8P13-B, WSB-M8P1-H and WSB-M15P4-D.

The following in-house polyurethane adhesive dispersion was formulated. The method for forming a polyurethane dispersion is well within the skill of the art. The dimethylol propionic acid, polyols and isocyanates were reacted to form a pre-polymer. The pre-polymer was neutralized with the amine and subsequently dispersed in water to form the dispersion.

| Polyurethane 2800 | | |
|---|---|---|
| Component | Parts | Range* |
| Hexanediol Adipate[1] (S105-36) | 0.1498 | ±10% |
| Hexanediol Adipate[2] (S105-110) | 0.0796 | ±10% |
| Dimethylol propionic acid | 0.0136 | ±10% |
| Hexamethylene Diisocyanate | 0.0492 | ±10% |
| Trimethyl hexamethylene diisocyanate | 0.0032 | +10% |
| Methyl Ethyl Ketone | 0.0525 | ±3% |
| Triethylamine | 0.0087 | ±10% |
| Water | 0.6303 | +10% |
| Additives thickeners, fungicides and bacteriocides | 0.0128 | 0–3% |
| | 1.0000 | |

[1]Reaction product of 1,6-hexamediol and adipic acid MW.3000, Ruco
[2]Reaction product of 1,6-hexamediol and adipic acid MW.3000, Ruco
[3]Bennox 1010, Mayzo
*based on the total weight of the dispersion.

The polyurethane adhesive is a polyester type that is designed to activate easily, e.g. glue line temperatures below 150° F. and fast setting times of 15 seconds.

EXAMPLE I

Referring to the figure, a laminated product embodying the invention is shown generally at 10 and comprises a base material 12, e.g. a 12 ounce needle punch blend of 60/40 polypropylene polyester, Foss Mfg., (Waste PP/Polyester Blend) and a facing fabric 14, e.g. 10 denier polypropylene with a low pile random pattern dilore construction where the fibers are bonded together with latex, Foss Mfg., Tempest M3H-103A, were coated with a 25/75 by weight adhesive blend 16 of a polyurethane 2800 and ethylene vinyl acetate (Air Products) Air Flex 465 (water base) with up to an additional 5% by weight of a water dispersible isocyanate curative, e.g. polymeric isocyanate; reaction product of 1,6-hexamethylene diisocyanate with a polyether of glycol, Bayer Mfg.

Approximately 1.8 ounces of wet adhesive was applied to each surface, the surfaces were 2160 inches². After drying, the adhesive coated surfaces were heated to a surface temperature of approximately 150° F. and assembled with about 40 pounds of pressure. A tenacious bond was formed immediately which could only be broken with disruption of one or the other of the bound surfaces. Bonds sustained a 300 gram load at 212° F. indefinitely on a one inch wide bonded area. The assemblies passed four separate tests, fogging tests, humidity tests, cycling tests (heat, cold and humidity) and flexing tests after exposure to Xenon arcs. These tests are summarized in Ford Motor Company's published specification WSB M15P4-D: humidity paragraph 3.5.1 (above the melt line); 305.2 heat exposure, heat humidity and cold cycle, 3.10.1 bond strength; 3.14 fogging; ESB-M8D13-B: 3.11 fly adhesion; and WSS-M15P4-E, 3.5.1 short term cycle heat, humidity and cold cycle; 3.5.2.1 long term heat exposure; 3.5.3 heat humidity and cold cycle, 3.10.2 adhesion and bonding and 3.14 fogging.

EXAMPLE II

A vinyl skin, Haartz Corp., Corinthian; expanded vinyl, Sandusky Vinyl Products, Brown or Beige and knit backed vinyl, Canadian General Tower, Buckskin, were each substituted for the face fabric of Example I. Polyurethane adhesive 2800 per se was substituted for the 75/25 polyurethane/EVA blend of Example I. The water dispersible isocyanate curative was used at levels of 3–5% by weight. Testing was done in the manner as described in Example I. All three bound laminates passed the four tests exemplified in Example I.

EXAMPLE III

A base material, Foss. Mfg., Tempest M3H-103A, was coated with a moisture-curing polyurethane hot melt, Bostik, PF-1064 at 150° F. The coating thickness was the same as the total coating thicknesses of Example II. It was immediately contacted with a face fabric Foss. Mfg., Waste PP/Polyester blend and pressure was applied at 40 lbs. to complete the laminate. Open time of the hot melt was up to 120 seconds.

EXAMPLE IV

A high performance adhesive polyurethane film, Bemis Corporation, PK-0052, was applied to a fabric, Foss Mfg., Tempest M3H-103A and pre-nipped at 2 psig with heat up to 300° F. for 1–2 seconds to form a base material. The base material was bonded to a face fabric vinyl, Canadian General Tower, Buckskin, with the use of heat, e.g. infrared lamps by heating the polyurethane film to 250° F. and pressurizing at 40 psig. Completed assemblies were tested and found to be acceptable in the tests described in Example I.

EXAMPLE V

An acrylic hot melt pressure sensitive adhesive, Schenectady Commercial #9639 was used to bond a base material Foss. Mfg., Tempest M3H-103A, to vinyl assemblies, specifically Canadian General Tower, Buckskin. The adhesive was applied to one of the surfaces and the other vinyl fabric (uncoated substrate) was immediately applied and pressurized. Bonds can be assembled immediately or up to 120 seconds after application of the hot melt. Bonds were found to be acceptable in tests conducted as outlined in Example 1.

The foregoing description has been limited to a specific embodiment of the invention. It will be apparent, however, that variations and modifications can be made to the invention, with the attainment of some or all of the advantages of the invention, Therefore, it is the object of the appended claims to cover all such variations and modifications as come within the true spirit and scope of the invention.

Having described our invention, what we now claim is:

1. A laminated construction for automotive interior trim applications which comprises:

a base material comprising a moldable felt;

a facing fabric selected from the group consisting of polypropylene, polyester and vinyl fabrics;

the base material and facing fabric joined to one another with a heat activatable adhesive selected from the group consisting essentially of polyester based polyurethane adhesive dispersions and acrylic hot melt pressure sensitive adhesives to form a laminated construction, the construction having a heat exposure, heat humidity, cold cycle property and bond strength which meet Ford Motor Specification WSB M15P4-D.

2. The construction of claim 1 wherein the base material is a spun bond fabric.

3. The construction of claim 1 wherein the facing fabric is a polypropylene or polyester of low pile random pattern dilore construction, said dilore construction having fibers that are bonded together with latex or fused together with a polyolefin film.

4. The construction of claim 1 wherein the base material is a needle punched polyester-face tacked to a needle punch blend of 60/40 polypropylene/polyester; and the facing materials are selected from the group consisting of expanded vinyls, knit back vinyls, knit back semi-perforated vinyls, 10 denier polypropylene and polyester with a low pile random pattern dilore construction, said dilore construction having fibers that are bonded together with latex or fused together with a polyolefin film.

* * * * *

UNITED STATES PATENT AND TRADEMARK OFFICE
CERTIFICATE OF CORRECTION

PATENT NO. : 5,939,342
DATED : August 17, 1999
INVENTOR(S) : Bragole et al.

It is certified that error appears in the above-identified patent and that said Letters Patent is hereby corrected as shown below:

On the title page: Item

[73] Worthen Industries, Inc., Nashua, N.H.

Signed and Sealed this

Twenty-eighth Day of November, 2000

Attest:

Q. TODD DICKINSON

Attesting Officer

Director of Patents and Trademarks